United States Patent
Poppe

(10) Patent No.: US 8,141,251 B2
(45) Date of Patent: Mar. 27, 2012

(54) METHOD FOR MANUFACTURING A FILLING MATERIAL

(75) Inventor: Willy Poppe, Sint-Niklaas (BE)

(73) Assignee: Imhold, Naamloze Vennootschap, Sint-Niklaas (BE)

( * ) Notice: Subject to any disclaimer, the term of this patent is extended or adjusted under 35 U.S.C. 154(b) by 870 days.

(21) Appl. No.: 12/223,378

(22) PCT Filed: Feb. 1, 2007

(86) PCT No.: PCT/BE2007/000014
§ 371 (c)(1),
(2), (4) Date: Jul. 30, 2008

(87) PCT Pub. No.: WO2007/087695
PCT Pub. Date: Aug. 9, 2007

(65) Prior Publication Data
US 2009/0071302 A1 Mar. 19, 2009

(30) Foreign Application Priority Data
Feb. 2, 2006 (BE) .................................. 2006/0067

(51) Int. Cl.
*B23P 13/00* (2006.01)
(52) U.S. Cl. ..................... 29/896.92; 29/896.9; 29/91.1; 29/429; 5/719; 5/720
(58) Field of Classification Search ................ 29/896.9, 29/896.92, 91, 91.1, 430, 429; 5/655.7, 655.8, 5/655.9, 718, 719, 720, 727, 740
See application file for complete search history.

(56) References Cited

U.S. PATENT DOCUMENTS

| | | | | |
|---|---|---|---|---|
| 2,539,058 | A * | 1/1951 | Burns | 5/652 |
| 3,730,031 | A * | 5/1973 | Huttemann | 83/874 |
| 4,194,255 | A * | 3/1980 | Poppe | 267/153 |
| 4,700,447 | A | 10/1987 | Spann | |
| 5,534,208 | A * | 7/1996 | Barr et al. | 264/160 |
| 5,666,682 | A * | 9/1997 | Bonaddio et al. | 5/736 |
| 5,688,538 | A * | 11/1997 | Barr et al. | 425/299 |
| 6,347,423 | B1 * | 2/2002 | Stumpf | 5/720 |
| 2006/0282954 | A1 | 12/2006 | Poppe | |

FOREIGN PATENT DOCUMENTS

| | | |
|---|---|---|
| BE | 1 014 277 A | 7/2003 |
| WO | WO 03/003878 A2 | 1/2003 |
| WO | WO 2005/020761 A1 | 3/2005 |

* cited by examiner

*Primary Examiner* — David Bryant
*Assistant Examiner* — Ryan J Walters
(74) *Attorney, Agent, or Firm* — Bacon & Thomas, PLLC

(57) ABSTRACT

Method for manufacturing a filling material, characterised in that it consists at least in providing cylindrical foam springs (14) between two support layers (2,9) and in fixing them to the latter, for example by gluing the crosscut ends (15) to the support layers (2,9), after which the thus obtained double-coated layer (16) is cut, through the support layers (2,9), in two single-coated layers which each mainly consist of a single support layer (2, 9) with shorter foam springs (14) connected thereto.

9 Claims, 1 Drawing Sheet

METHOD FOR MANUFACTURING A FILLING MATERIAL

BACKGROUND

A. Field

The present invention concerns a method for manufacturing a filling material.

B. Related Technology

In particular, the invention concerns a method for manufacturing filling materials with varying degrees of hardness and varying thicknesses going from springy filling materials for mattresses, pillows and parts of furniture to sit or to lie on, to relatively tough filling material for sandwich panels, for example for the car and aeronautical industry.

A known method for manufacturing a filling material for mattresses, pillows and the like is described in international patent application WO 03/003878.

This method consists in providing strips of synthetic or natural foam and in making incisions in them, after which these strips are rolled up so as to form a cylinder whereby their longitudinal side edges are fixed to one another, for example by means of gluing. Due to this imposed shape, the cuts are deformed in such a manner that they are pulled open or opened wide on the outside of the cylinder, such that cavities are formed which are mutually separated by ribs. These cavities narrow towards the centre of the cylinder.

By arranging a number of cylinders in a bundle and by mutually gluing these cylinders together, in particular by providing a glued joint between the leaning ribs, and by subsequently cutting this bundle in a direction crosswise to the axis of the above-mentioned cylinders, layers or plates are obtained so to say which are built of cylindrical or ring-shaped bodies which are glued together and which can be compressed in an elastic manner and therefore will be called foam springs further on.

A problem arising with this method is that the number of cylinders which can be mutually connected is restricted. Indeed, too large a number of mutually connected cylinders results in a heavy, cumbrous and unmanageable chunk.

Moreover, due to the heavy weight of larger layers, the glued joints between the leaning ribs of the foam springs will give way while these layers are being manipulated.

Also, the method as discussed is applied in particular for manufacturing small layers or plates of filling material.

Another problem which arises with the method for manufacturing a filling material for mattresses, pillows and the like, as described in WO 03/003878, is that thin layers of for example 3 cm or 4 cm cannot be manufactured in a consistent and unalterable manner, since the knife deforms the free ends of the bundled cylinders somewhat too much, and there is no space available to hold the far ends in an efficient manner during the cutting.

Thus cutting thin layers results in layers with unwanted variations in relation to the aimed shape.

However, the thin layers are ideal for producing an alternative filling material which can be used to replace the conventional comfort layers in mattresses, furniture to sit on, car seats, packings, etc. Among the advantages can be mentioned the weight-saving which can amount to over 20%, the improved air permeability, a better shock absorption and savings on raw materials of up to more than 25%.

BRIEF SUMMARY OF THE INVENTION

The present invention aims a method which does not have these and other disadvantages and whereby, apart from the thick and/or small layers or plates of filling material, also thin and/or large layers of filling material can be manufactured in a cost-effective manner.

To this end, the invention concerns a method for manufacturing a filling material which consists at least in providing cylindrical foam springs between two support layers and in fixing them to the latter, for example by gluing the crosscut ends of the foam springs to the support layers, after which the thus obtained double-coated layer is cut, through the support layers, in two single-coated layers which each mainly consist of a single support layer with shorter foam springs connected thereto.

The resulting layer can thus be used as filling material for mattresses or the like or as sandwich material for the car and aeronautical industry, or it can be further processed in subsequent steps.

A major advantage is that thin and yet precisely and consistently made layers of filling material can thus be manufactured.

Indeed, both far ends of the foam springs are connected to a support layer during the cutting operation, so that they are not deformed too much.

Another advantage consists in that also large layers of filling material can thus be manufactured. Indeed, the connection of the foam springs to a support layer, preferably at the crosscut ends, results in a sufficiently strong connection which can resist heavy forces, for example during the manipulation of large layers.

In a preferred embodiment, the thus obtained layers or plates are provided with a further support layer during a finishing operation, namely at the free ends of the foam springs.

A thus obtained layer or plate can be used as a filling material or it can be cut in two layers or plates again, through the support layers, in a subsequent finishing operation.

In this manner, and by possibly further repeating the possible finishing operations as mentioned, one can obtain very thin layers.

DESCRIPTION OF THE DRAWINGS

In order to better explain the characteristics of the invention, the following preferred application of a method for manufacturing a filling material according to the invention is described as an example only without being limitative in any way, with reference to the accompanying drawings, in which:

FIG. 1 schematically represents a device which can be used to implement the method according to the invention for producing filling material.

DETAILED DESCRIPTION OF PREFERRED EMBODIMENTS OF THE INVENTION

Figure 1:
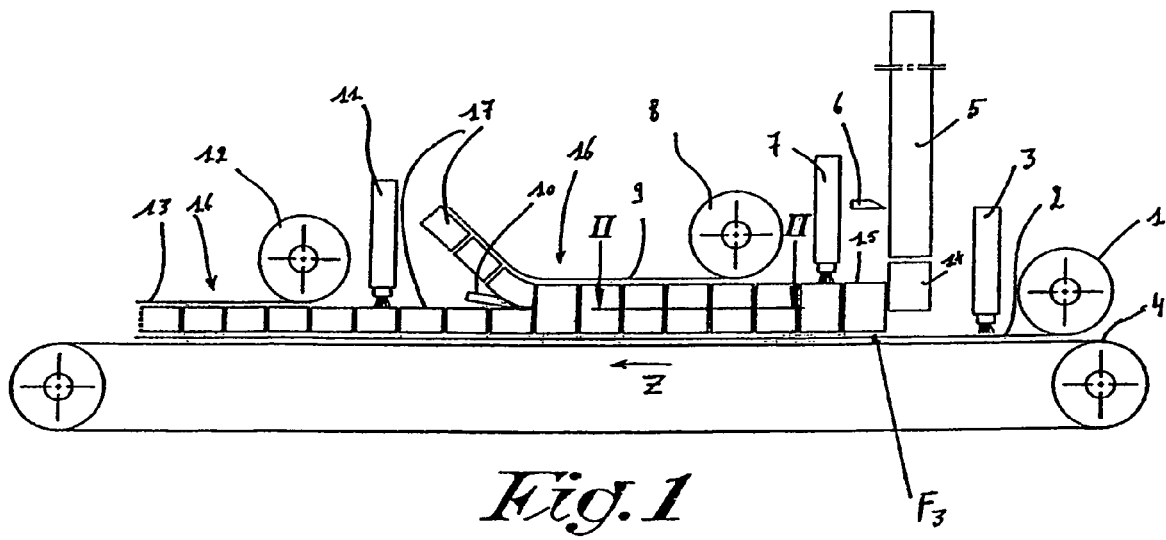
FIG. 1 schematically represents a device with which the method according to the invention can be applied.

The direction of progress Z is from right to left, and in that same direction the device mainly consists of a first bobbin 1 for supplying a first support layer 2, a gluing device 3, an endless conveyor belt 4 and on top of that, but not represented, a device for producing a continuously supplied foam cylinder 5.

Between the device for producing the foam cylinder 5 and the conveyor belt 4 are provided knives 6 and a robot arm which is not represented. Further, in the direction of progress Z are provided a second gluing device 7 and a second bobbin 8 for supplying a second support layer 9.

Further, in the direction of progress Z are provided a knife or cutting blade 10, a third gluing device 11 and a third bobbin 12 with a third support layer 13.

The working of this device and the applied method according to the invention is simple and as follows.

The first support layer 2, in this case a PU foam, is unrolled from the first bobbin 1 and is carried and moved in the direction Z during the process by the conveyor belt 4.

As the process continues, the support layer 2 is first provided with a layer of glue by means of the gluing device 3. Different types of glue can be used, single-component glue as well as epoxy glue. What is called a "hot melt" is preferably used, which is liquefied by the heat and is sprayed on the support layer 2 in the form of continuous or interrupted strips.

Figure 2:
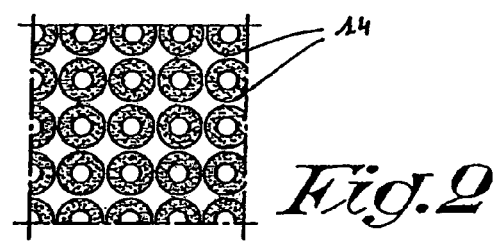
FIG. 2 represents a section of a filling material according to line II-II in FIG. 1.

In a subsequent operation, foam springs 14 having axial ends has one end of the axial ends placed on the layer of glue, in this case by means of a robot arm, for example according to the pattern as represented in FIG. 2.

The robot arm each time seizes a foam spring 14 which is cut at the required height from the continuously supplied foam cylinder 6 by means of the knives 6.

The process speed of the conveyor belt 4 and of the process itself is determined among others by the speed at which the foam cylinders 5 are provided over the entire width of the support layer 2.

In a subsequent operation, the second support layer 9, also made of PU foam, is unwound from the second bobbin 8 and, after it has been provided with a layer of glue by means of the gluing device 7, this second support layer 9 is provided with the foam springs 14 on the crosscut ends 15. In other words, the cylindrical foam springs are positioned to extend axially between the first and second support layers, where the cylindrical foam springs have a first length.

This second support layer 9 may then be possibly pressed onto the free end of the cylindrical foam springs connected to the first support layer 2 to obtain a double-coated layer or double support layered assembly 16 which can be subjected to an accelerated curing process. The double coated-layer or double support layered assembly 16 is constructed in a way so that the cylindrical foam springs extend lengthwise between the first support layer 2 and the second support layer 9.

The double-coated layer or double support layered assembly 16 with a thickness between 4 cm and 20 cm, in this case for example 12 cm, is then carried up to the cutting blade 10, for example when the glue 2 has enough adhesive power and thus has dried or cured sufficiently The cutting blade 10 then cuts the double-coated layer or double support layered assembly 16 into two single-coated layers 17 along a direction extending between the support layers 2 and 9. In this case, the double-coated layer or double support layered assembly 16 is cut down the middle of the cylindrical foam springs between the support layers, so that the two layers 17 each have a desired length or thickness, e.g., a thickness of 6 cm. The resulting two single-coated layers 17 each have one axial end of the cylindrical foam springs connected to a support layer, i.e., either the first support layer 2 or second support layer 9, and the other axial end is a free end, i.e., not connected to a support layer. Additionally, the resulting single-coated layers 17 have the desired length or thickness of the cylindrical foam springs.

It is clear that the foam springs 14 deform relatively little during the cutting operation between the support layers 2 and 9, thanks to the two-sided connection of the foam springs 14 to the support layers 2 and 9, even in case of relatively soft foam springs.

Every single-coated layer 17 mainly consists of a single support layer 2 or 9 having foam springs 14 connected thereto, which single-coated layers 17 can thus serve as filling material for mattresses or the like, as such or as an intermediate product.

Indeed, the single-coated layer 17 as obtained with the method as discussed above must undergo an additional finishing in this case.

The third gluing device 11 provides an additional layer of glue on the free ends of the foam springs 14 which have been cut in two, and onto that is provided a third support layer 13, such that a double-coated layer or assembly 16 is again obtained, with a smaller thickness than the preceding one however.

As far as the production of the continuously supplied foam cylinder is concerned, it will be clear that a continuously supplied strip made of the foam or rubber out of which the foam bodies are made is taken as a basis.

In every strip are made longitudinal incisions with a cross pattern.

The strip is produced in a continuous manner in this case.

Figure 3:
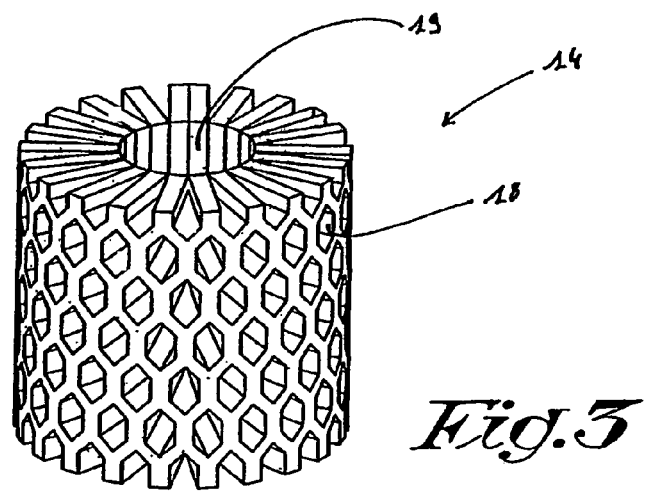
FIG. 3 represents a detail of a foam spring as indicated by arrow F3 in FIG. 1, seen in perspective.

Every strip is then rolled up to a foam cylinder 5 as represented in FIG. 3, after which the two longitudinal side edges of the strip are glued together.

The diameter of such a foam cylinder 5 corresponds to the required diameter for a foam spring 14.

The incisions make it easier to roll the strip up to a foam cylinder 5. When forming the foam cylinder 5, the incisions are deformed, such that cavities 18 are created which are opened wide on the outer wall of the foam cylinder 5 and which narrow towards the centre of the foam cylinder 5.

The incisions preferably extend crosswise through the strip. If this is not the case, the incisions will be provided on the side of the strip situated on the outside of the roll 8 when it is being rolled into a foam cylinder 5.

The knives 6 as well as the cutting blade 10 can be replaced by other cutting means, such as for example by a laser beam, which may be more appropriate for example for cutting according to varying inclinations or even to obtain curved surfaces.

Several continuously supplied foam cylinders 5 may possibly be simultaneously provided, and the robot arm may be designed to place several foam springs 14 simultaneously in the required position on the support 2.

Filling materials obtained from foam cylinders 5 made of relatively tough rubber or of relatively rigid synthetic material can be used as a layer of sandwich material for the car and aeronautical industry. Such filling materials may also be used as insulating material or in the packing industry. The thickness of the filling materials can strongly vary and it can even be limited to a few millimeters, in which case the foam springs 14 are transformed into rings.

Filling materials obtained from foam cylinders 5 made of soft rubber or soft synthetic foam form springy elements which can be used as filling material for mattresses, pillows, seats and backs of furniture to sit or to lie on.

The filling material may hereby be even entirely or partly coated with a layer of foam.

The hardness and, if necessary, the springy qualities of the single-coated layers 17 of filling material can be altered by providing a core in the central opening 19 of a number or all of the foam springs 14.

These cores can be provided after the double-coated layer 16 has been cut through or, according to another method, a core can be provided in the continuously supplied foam cylinder 5 before it is supplied up to the knives 6. In this manner, the foam cylinder 5 and the core provided therein are cut through by the knives 6 in a single movement, before the thus obtained foam springs 14 are placed on the first support 2.

These cores can be made of a hard synthetic foam or of rubber for example.

It is clear that the support layers 2, 9 and 13 must not be made out of the same material.

A support layer 2, 9 and 13 can be made of different materials such as for example polyurethane (PU) foam, felt or a non-woven material.

It is also clear that the process of applying an additional support layer 13 and of cutting at the required height can be repeated if required.

It should be noted that the foam springs 14 of the continuously supplied foam cylinder 5 can be cut crosswise as well as slantingly in relation to the axis of the foam cylinder 5 or, in a special application, even according to any desired curve.

A double-coated layer 16 can be cut through between the support layers 2 and 9 or 2 and 13 in a plane, either or not parallel to a support layer 2 or 9 or 13, or according to a three-dimensionally curved surface.

The gluing can be done in different ways, for example also by means of a roller.

The present invention is by no means restricted to the above-described method for manufacturing a filling material as illustrated in the accompanying drawings; on the contrary, such a method can be made according to different variants while still remaining within the scope of the invention.

The invention claimed is:

1. A method for manufacturing a filling material having a layer of cylindrical foam springs having a desired length or lengths, said method comprising:
   providing cylindrical foam springs having opposed axial ends and extending axially between two support layers, wherein said cylindrical foam springs have a first length which is larger than said desired length;
   fixing said cylindrical foam springs at said axial ends to the support layers to obtain a first double support layered assembly, wherein the double support layered assembly comprises said support layers with said cylindrical foam springs extending lengthwise between the support layers;
   cutting said cylindrical foam springs fixed to said two support layers along a direction extending between said support layers to form a set of two single support layered assemblies, wherein each single support layered assembly has a layer of cylindrical foam springs having a free end and a support layered end attached to one of the two support layers,
   wherein at least one of the two single support layered assemblies comprises cylindrical foam springs having said desired length or lengths; attaching an additional support layer on said free end of at least one of the set of two single support layered assemblies to form a second double support layered spring assembly;
   cutting said second double support layered assembly along a direction extending between said support layers to form a second set of two single support layered assemblies; and then
   repeating said attaching of an additional support layer to a free end of a single support layered assembly to form another double support layered assembly and said cutting of the another double support layered assembly until the first double support layer covered assembly is divided into a desired number of single or double support layer covered assemblies.

2. The method according to claim 1, wherein the cylindrical foam springs have equal heights, such that the two support layers are parallel to each other when the first double support layered assembly is obtained.

3. The method according to claim 1, wherein said cylindrical foam springs have different heights, wherein said cylindrical foam springs are configured in a way such that the first double support layer assembly forms a curved surface when the cylindrical foam springs is fixed between the two support layers.

4. The method according to claim 1, wherein the support layer is made of polyurethane (PU), felt or a non-woven material.

5. The method according to claim 1, wherein the step of providing cylindrical foam springs comprises continuously supplying a cylindrical foam cylinder and cutting said continuously supplied cylindrical foam cylinder into cylindrical foam spring.

6. The method according to claim 5, wherein the at least one continuously supplied foam cylinder for producing cylindrical foam springs is cut crosswise, slantingly or according to any desired curve but each time at an equal first length or at a varying first length.

7. The method according to claim 1, wherein the cylindrical foam springs are automatically placed on said support layer.

8. The method according to claim 1, wherein said first double-support layered assembly is cut through between the support layers along a plane that is parallel with or non parallel with a support layer, or according to a three-dimensionally curved surface.

9. The method according to claim 1, wherein said foam springs have a central lengthwise opening and a cylindrical wall with cavities extending from an external surface of the wall to an internal surface of the wall.

* * * * *